(No Model.)
M. W. SMITH.
KITCHEN UTENSIL.
No. 604,092.                              Patented May 17, 1898.
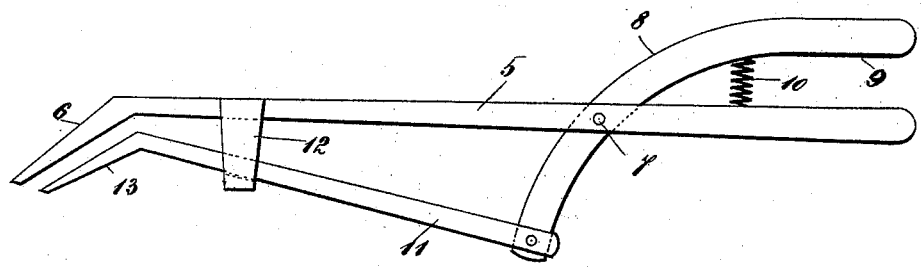
WITNESSES
INVENTOR
Milton W. Smith
BY
Edgar Tate &Co
ATTORNEYS

United States Patent Office.

MILTON W. SMITH, OF LONG ISLAND CITY, NEW YORK.

KITCHEN UTENSIL.

SPECIFICATION forming part of Letters Patent No. 604,092, dated May 17, 1898.

Application filed September 14, 1896. Serial No. 605,788. (No model.)

*To all whom it may concern:*

Be it known that I, MILTON W. SMITH, a citizen of the United States, and a resident of Long Island City, in the county of Queens and State of New York, have invented certain new and useful Improvements in Kitchen Utensils, of which the following is a specification, reference being had to the accompanying drawing, forming a part thereof, in which similar numerals of reference indicate corresponding parts.

This invention relates to kitchen utensils; and the object thereof is to provide an improved device of this class which is designed for use in handling small pots, pans, and other and similar vessels when hot, the object thereof being to provide an effective device by means of which vessels of the class referred to may be removed from a stove or range or placed thereon or therein when hot without burning the hands.

The invention is fully disclosed in the following specification, of which the accompanying drawing forms a part, said drawing being a side view of my improved utensil.

In the practice of my invention I provide a kitchen utensil which is somewhat similar in operation to a pair of tongs, and which consists of a bar 5, the body portion of which is preferably straight, and which is provided at its free or outer end with an angular projection 6, and pivotally connected with said bar at 7 is a segmental or circular lever 8, the longer end of which projects substantially parallel with the adjacent end of the bar 5, as shown at 9, and between said lever and the end of said bar is a spiral spring 10, which operates to force the same apart.

Pivotally connected with the shorter end of the lever 8 is a bar 11, which passes through a suitable keeper 12, secured to the bar 5, and which is provided at its free end with an angular projection 13, which is held parallel with the projection 6 of the bar 5.

The keeper 12 is preferably secured to or formed on the bar 5 and is designed to hold the bar 11 normally in the position shown in the drawing, in which position the projections 6 and 13, which constitute the jaws of the device and by means of which a pot, kettle, pan, or similar vessel may be handled, are held parallel and a short distance apart, and whenever it is desired to handle or manipulate the vessel the device is grasped by the parallel ends at 9 in the usual manner. These parallel ends constitute the handle, and the pot, kettle, pan, or other vessel is grasped by the jaws 6 and 13, and then by pressing the handles together said vessel may be removed from the stove or range or placed therein or thereon or otherwise manipulated without injury to or danger of burning the hands.

This device is simple in construction and operation and perfectly adapted to accomplish the result for which it is intended, while being also comparatively inexpensive.

Having fully described my invention, I claim as new and desire to secure by Letters Patent—

The herein-described kitchen utensil comprising a bar 5, having an angular projection 6, a segmental lever 8, pivotally connected with bar 5 at 7, a spiral spring 10 mounted between said bars, a bar 11 pivotally connected with said segmental lever having an angular projection 13 adapted to engage the angular projection on the bar 5, and a keeper 12 secured to the bar 5, and adapted to hold the bar 11 and permit the same to slide therein, substantially as shown and for the purpose set forth.

In testimony that I claim the foregoing as my invention I have signed my name, in presence of the subscribing witnesses, this 11th day of September, 1896.

MILTON W. SMITH.

Witnesses:
 W. W. HILL,
 CHARLES S. ROGERS.